(12) United States Patent
Hornbachner et al.

(10) Patent No.: US 11,920,761 B2
(45) Date of Patent: Mar. 5, 2024

(54) SOLAR OPERATED ILLUMINATION APPARATUS

(71) Applicant: ICGH Investment and Consulting GmbH, Vienna (AT)

(72) Inventors: Dieter Hornbachner, Vienna (AT); Ismar Mulalic, Vienna (AT); Tim Kovacic, Vienna (AT)

(73) Assignee: ICGH Investment and Consulting GmbH, Vienna (AT)

( * ) Notice: Subject to any disclaimer, the term of this patent is extended or adjusted under 35 U.S.C. 154(b) by 0 days.

(21) Appl. No.: 17/760,523

(22) PCT Filed: Aug. 13, 2020

(86) PCT No.: PCT/EP2020/072752
§ 371 (c)(1),
(2) Date: Mar. 15, 2022

(87) PCT Pub. No.: WO2021/063580
PCT Pub. Date: Apr. 8, 2021

(65) Prior Publication Data
US 2022/0349540 A1    Nov. 3, 2022

(30) Foreign Application Priority Data

Oct. 2, 2019    (EP) .................................... 19201027

(51) Int. Cl.
*F21S 9/03*    (2006.01)
*F21V 29/70*    (2015.01)

(52) U.S. Cl.
CPC .............. *F21S 9/037* (2013.01); *F21V 29/70* (2015.01)

(58) Field of Classification Search
CPC .......... F21S 9/037; F21V 29/70; Y02B 20/72; Y02E 10/50; H02S 20/10; H02S 30/10; H02S 40/425
See application file for complete search history.

(56) References Cited

U.S. PATENT DOCUMENTS

| 4,224,082 A | 9/1980 | Jacobson | |
| 7,731,383 B2 * | 6/2010 | Myer | ...................... F21S 9/037 362/373 |

(Continued)

FOREIGN PATENT DOCUMENTS

| DE | 20022415 U1 * | 8/2001 | .............. F21S 8/083 |
| DE | 202016005734 U1 | 11/2016 | |

(Continued)

OTHER PUBLICATIONS

International Preliminary Report on Patentability dated Apr. 5, 2022, in corresponding International Application No. PCT/EP2020/072752.

(Continued)

*Primary Examiner* — Zheng Song
*Assistant Examiner* — Glenn D. Zimmerman
(74) *Attorney, Agent, or Firm* — Hoffmann & Baron, LLP

(57) ABSTRACT

The disclosed subject matter relates to a solar-operated lighting device comprising a substantially tubular solar module, which is positioned vertically in its mounted position and electrically powers a light via at least one rechargeable battery and an electronics module, the at least one rechargeable battery and the electronics module each being arranged in the interior of the solar module with radial spacing therefrom, the solar module having a ventilation opening at both its upper end and its lower end, and the light forming a cover of the lower ventilation opening.

17 Claims, 4 Drawing Sheets

(56) References Cited

U.S. PATENT DOCUMENTS

| | | | |
|---|---|---|---|
| 2011/0305010 A1 | 12/2011 | Leadford et al. | |
| 2013/0322063 A1* | 12/2013 | Tittle | H02S 20/10 |
| | | | 362/183 |
| 2016/0285303 A1* | 9/2016 | Mi | H01M 10/465 |
| 2020/0059105 A1* | 2/2020 | Hoganson | H01M 10/46 |

FOREIGN PATENT DOCUMENTS

| | | | | |
|---|---|---|---|---|
| EP | 0849524 A2 | | 6/1998 | |
| EP | 1818605 A2 * | | 8/2007 | F21S 9/037 |
| KR | 20190042274 A | * | 4/2019 | |
| WO | 2010050993 A1 | | 5/2010 | |
| WO | WO-2011156562 A1 * | | 12/2011 | F21S 9/035 |
| WO | 2013093402 A2 | | 7/2013 | |

OTHER PUBLICATIONS

PCT International Search Report and Opinion corresponding to International Application No. PCT/EP2020/072752, dated Oct. 27, 2020.

European Patent Office Search Report corresponding to Application No. 19201027.0-1230, dated Jan. 2, 2020.

* cited by examiner

SOLAR OPERATED ILLUMINATION APPARATUS

CROSS-REFERENCE TO RELATED APPLICATIONS

This application is a National Phase application of International Application No. PCT/EP2020/072752 filed Aug. 13, 2020 which claims priority to the European Patent Application No. 19 201 027.0 filed Oct. 2, 2019, the disclosures of which are incorporated herein by reference.

TECHNICAL FIELD

The present disclosed subject matter relates to a solar-operated lighting device, comprising a substantially tubular solar module, which is positioned vertically in its mounted position and electrically powers a light via at least one rechargeable battery and an electronics module.

BACKGROUND

Tubular photovoltaic or solar modules are known from European patent EP 2 071 635 B1 by the same applicant and have the advantage that light can be utilized from all sides of the solar module. This also eliminates specific alignment of the solar module with the sun during assembly and operation. Owing to its tubular design, the solar module can be coaxially arranged on the mast, which requires a particularly small amount of space and allows for particularly esthetically pleasing lighting devices, e.g. for street lighting.

Currently, the rechargeable batteries and the electronics module of the lighting device are arranged in a switch box at the foot of the mast, which requires cables running through the mast and the use of special masts for this purpose. If the switch box is installed in an underground shaft beside the foot of the mast, complex excavation and construction works are required. In addition, the switch box has to be equipped with ventilation in order to cool the rechargeable batteries and the electronics module, since otherwise malfunctions may occur.

WO 2010/050993 discloses a lighting device according to the preamble of claim 1, comprising a tubular mast and a solar module attached thereto. In the interior of the mast, rechargeable batteries are arranged in the lower portion and a solar light comprising an electronics module is arranged in the upper portion.

BRIEF SUMMARY

The disclosed subject matter aims to provide a solar-operated lighting device which can be cost-effectively manufactured, can be rapidly constructed on site and has improved thermal behavior and thus high operational reliability.

This aim is achieved by a solar-operated lighting device comprising a substantially tubular solar module, which is positioned vertically in its mounted position and electrically powers a light via at least one rechargeable battery and an electronics module, wherein the at least one rechargeable battery and the electronics module are each arranged in the interior of the solar module with radial spacing therefrom, the solar module having a ventilation opening at both its upper end and its lower end, the solar module comprising an upper cover at the upper end and a lower cover at the lower end, an annular gap or a ring of openings, which forms the respective ventilation opening, being provided in the interface region between each cover and the solar module, and the lower cover being formed by the light.

In this way, the interior space in the tubular solar module is utilized for receiving all the electrical components, such as rechargeable batteries and electronics modules, such that cables are no longer required. A separate switch box is no longer needed, and cables in the mast are not needed either. As a result, standardized masts without cable bushings can in particular also be used, which reduces the manufacturing costs. By arranging the solar module vertically and by means of the ventilation openings on its lower and upper ends, convection cooling of the components contained in the interior of the solar module results, specifically due to the chimney effect of the air that is heated by the components and rises through the solar module. Additional forced cooling by fans is not required. At the same time, the air flow passing through the solar module from the bottom to the top also cools the solar module itself, and this increases the degree of efficiency and the service life of the solar module. As a result, a cost-effective, autonomous lighting device is provided that is simple to assemble and is not susceptible to malfunctions during operation.

The ventilation openings at the ends of the solar module may be implemented as annular gaps or as circumferential rings of openings, i.e. discontinuous annular gaps, whether this is in the respective solar-module end, the respective cover, or therebetween. According to the disclosed subject matter, the solar module comprises an upper cover at the upper end and a lower cover at the lower end, and an annular gap or a ring of openings, which forms the respective ventilation opening, is provided in the interface region between each cover and the solar module.

According to the disclosed subject matter, the lower cover is formed by the light itself, which is powered by the solar module. Therefore, all the components, i.e. the solar module, the rechargeable battery/batteries, the electronics module and the light, are combined in one single, autonomous, simple-to-assemble unit. At the same time, the waste heat from the light can be cooled by the air flow that passes through the annular gap or the ring of openings between the light and the lower end of the solar module. A single air flow, which is caused by the chimney effect, enters via the lower annular gap or ring of openings, rises in the annular space between the solar module and the rechargeable battery/batteries and electronics module and exits via the upper annular gap or ring of openings, thus cools all the components, i.e. the light, the solar module, the rechargeable battery/batteries and the electronics module.

Incorporating the light in the shared cooling air flow also has the advantage that the day/night offset of the heat build-up of both the light and the solar module can be utilized. The solar module and the electronics module are operated to charge the rechargeable batteries in the day, when the light is generally switched off, whereas, in the night, the light is operated and heat is generated, but then the solar module is not heated by solar radiation and the electronics module does not generate waste heat during charging-current control either. The quantity of heat transported through the interior of the solar module via the shared cooling air flow is thus divided between day and night and overheating of the lighting device is thereby prevented.

It is particularly advantageous for the light to be provided with a cooling body on its side facing the interior of the solar module for this purpose, such that it can release its heat to the rising cooling air flow in an improved manner.

The embodiment according to the disclosed subject matter of the lighting device comprising a light arranged on the underside may, for example, be suspended from a building, a mounting bridge, a mounting boom, etc. It is particularly advantageous for the solar module to be equipped on one end, optionally on both ends, with a projecting arm for mounting on a mast, a building or the like, and this provides stable anchoring. Particularly during mounting on a mast, the upper projecting arm may be mounted on the top of the mast and the lower projecting arm serves to support the mast, such that the solar module comes to rest in parallel beside the upper region of the mast.

In each of the above-mentioned embodiments, a plurality of rechargeable batteries may optionally be stacked on top of one another in the interior of the solar module. For example, the solar module has a height of 1-4 m, typically approximately 2 m, and a plurality of rechargeable batteries having a height of 30-60 cm can be received therein so as to be stacked on top of one another in the axial direction.

It is particularly advantageous for the electronics module to be positioned above the one or more rechargeable batteries with spacing. As a result, additional thermal separation is provided between the rechargeable batteries and the electronics module.

According to another optional feature of the disclosed subject matter, each solar module may comprise a tubular transparent body having photovoltaic elements on its inner face, the body being retained between two end rings, which are interconnected by rods extending in the interior of the solar module. The end rings together with the rods accommodate the structural loads of the suspension of the solar modules, such that the transparent body and the photovoltaic elements are protected against excessive loads. Optionally, in this case, at least three rods distributed over the inner circumference of the solar module are provided. This results in a cage-like supporting structure in the interior of the solar module.

In this case, in a particularly advantageous manner, the rods may be connected to one another via at least one supporting platform, on which the lowermost of the one or more rechargeable batteries is supported. Alternatively or additionally, the rods may be connected to one another via at least one additional ring, optionally at least two or three additional rings, each of which optionally surrounds one of the one or more rechargeable batteries. These measures result in secure and stable anchoring of the rechargeable batteries in the solar module without there being a risk of damage to the delicate solar module due to the rechargeable batteries being likely to hit said solar module in the event of shocks or vibrations, as may occur in high winds, for example.

BRIEF DESCRIPTION OF THE DRAWINGS

The disclosed subject matter will be explained in greater detail in the following with reference to embodiments shown in the accompanying drawings, in which.

DETAILED DESCRIPTION

Figure 1:
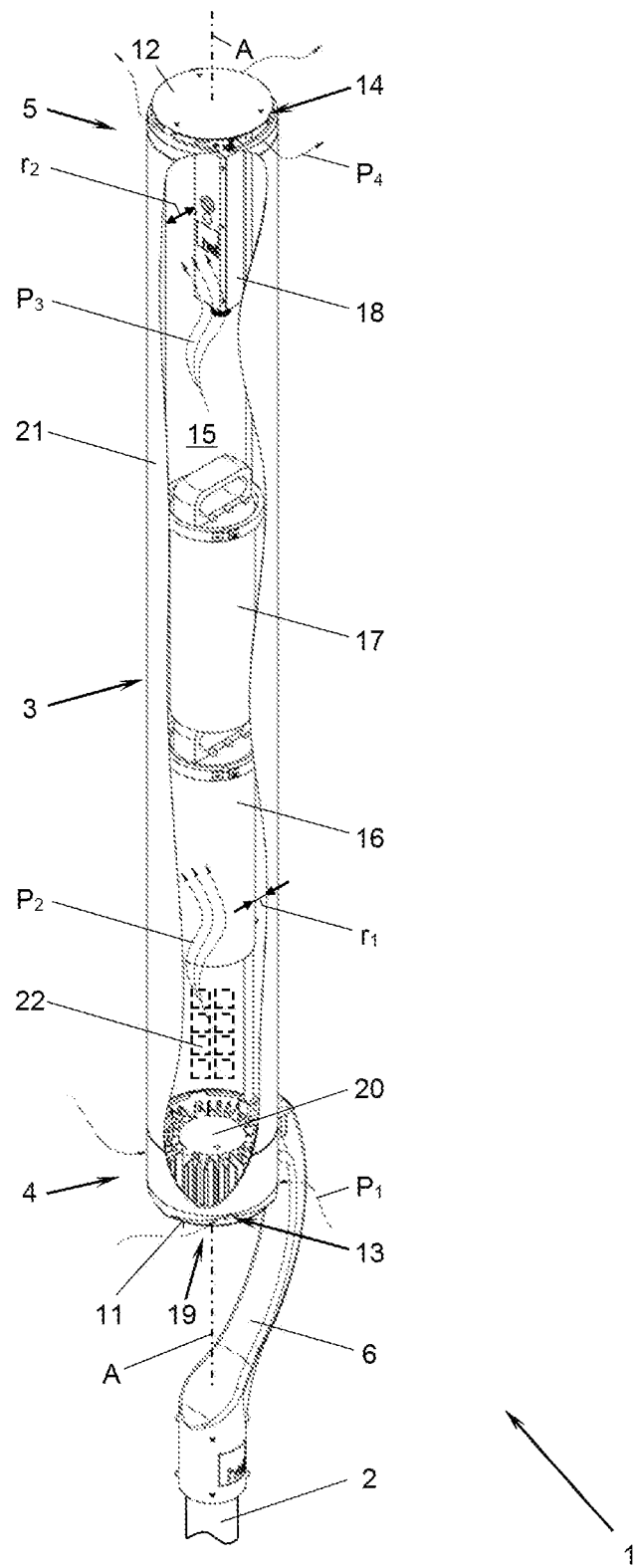
FIGS. 1 and 2 show a first embodiment of the lighting device of the disclosed subject matter in a partially cut-away perspective view (FIG. 1) and a perspective view without the glass body and photovoltaic elements (FIG. 2)
Figure 2:
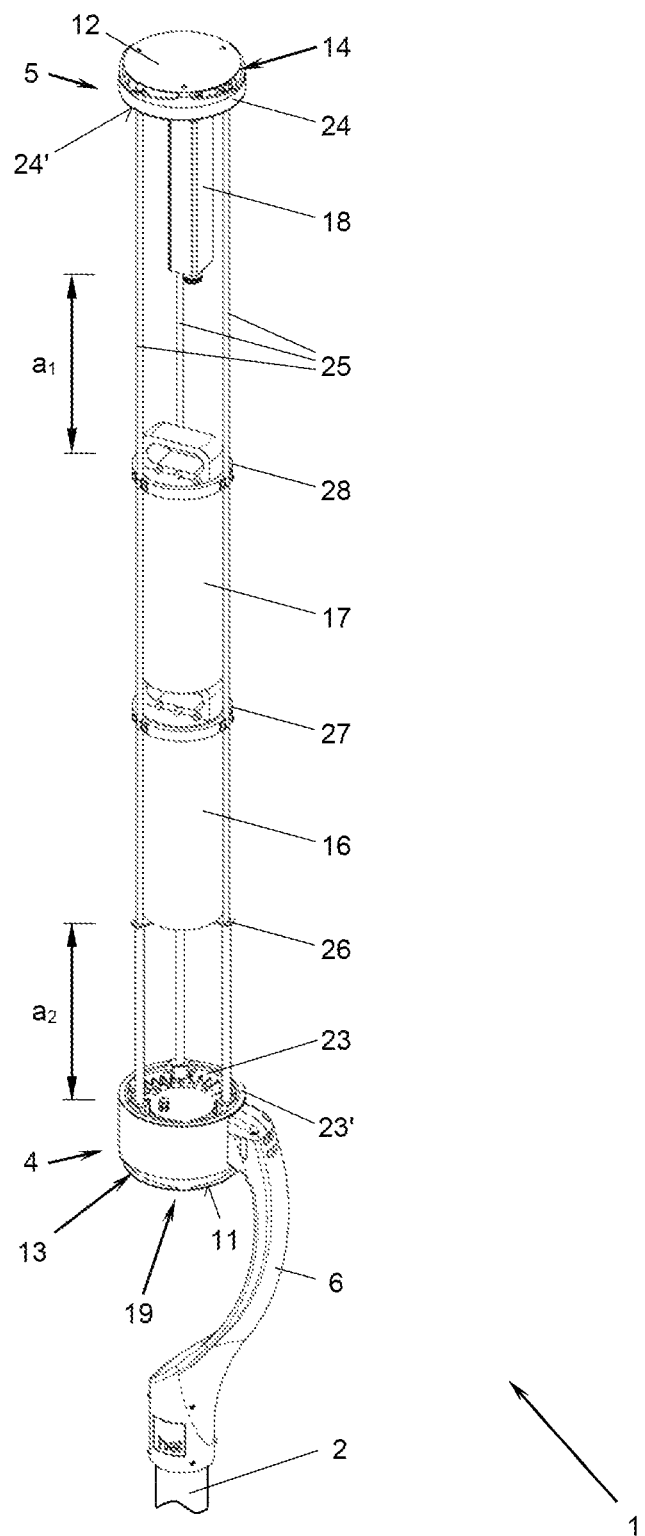

FIGS. 1 and 2 show a first embodiment of a lighting device 1 for public spaces, e.g. a street, which is mounted on a mast (only parts of which are shown). The lighting device 1 comprises an approximately tubular solar module 3 comprising a lower end 4 and an upper end 5. It is clear that, in the present description, the terms "upper" and "lower" each relate to the mounted position of the lighting device 1 shown in FIGS. 1-4, in which position the longitudinal axis A of the tubular solar module 3 is approximately vertical.

In the present description, the term "tubular" is understood to mean a tube having any cross section, whether this is a circular, oval, rectangular, square, triangular or any polygonal cross section.

In an exemplary embodiment, the mast 2 has a height of 4-20 m above ground, e.g. 8 m, and the axial length of a solar module 3 is 1-4 m, e.g. approx. 2 m.

In the embodiment in FIG. 1, the solar module 3 is mounted on the top of the mast 2 via a projecting arm 6 that projects laterally from its lower end 4 and is curved downwards. As shown in FIG. 1, the projecting arm 6 is curved such that the lighting device 1 is positioned coaxially above the mast 2 with spacing in order to exert the least possible torque on the mast 2. It is, however, clear that the lighting device 1 can also be mounted on any supporting structure in another way, for example by means of a projecting arm (not shown) that projects laterally from the upper end 5 of the solar module 3 or by means of a supporting element (not shown) that projects upwards from the upper face of the solar module 3 for suspension from a carrier, building part, mounting bridge, etc.

Figure 4:
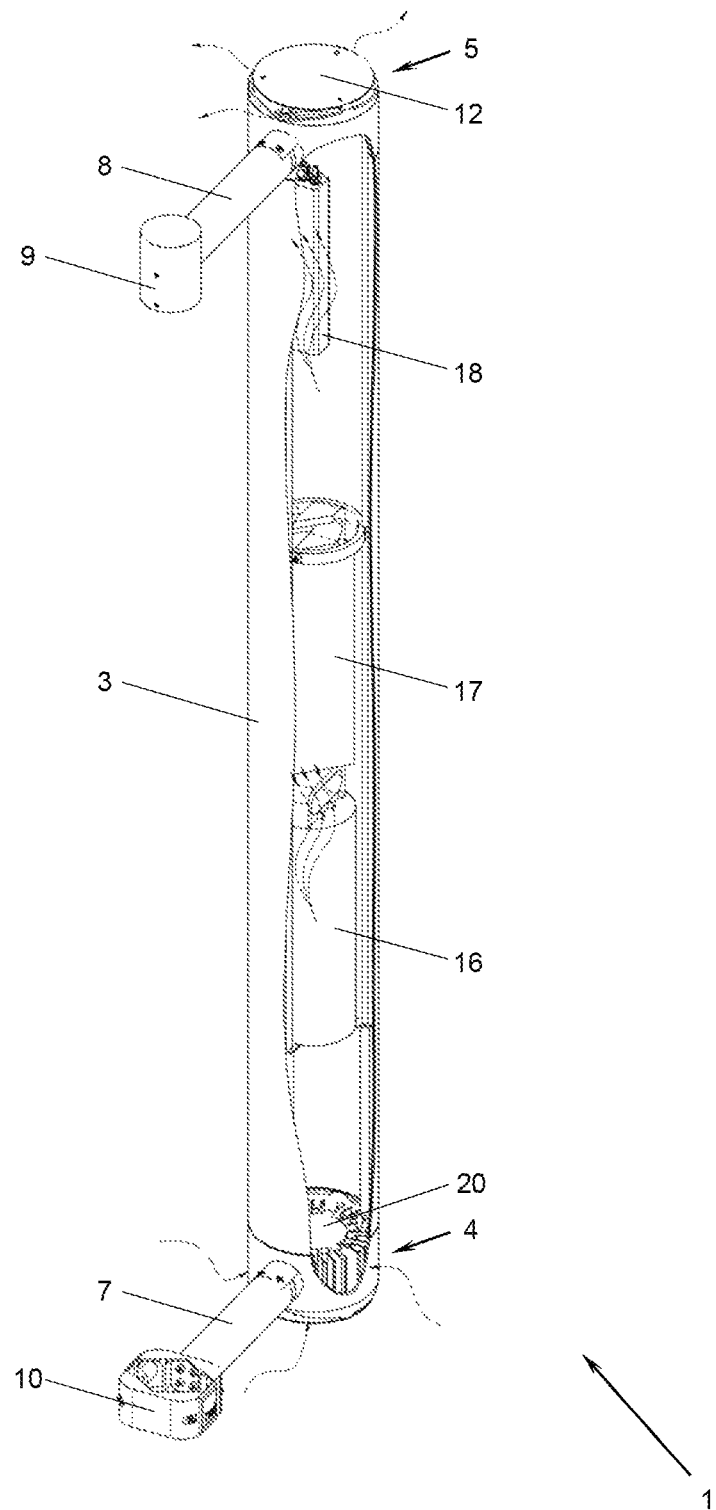
FIG. 4 shows a variant of the first embodiment in FIGS. 1 and 2 in a partially cut-away perspective view.

For example, FIG. 4 shows a variant of the embodiment from FIG. 1 in which both the lower end 4 and the upper end 5 of the solar module 3 are each equipped with a laterally projecting arm 7, 8. The upper projecting arm 8 has a cap 9 on its end, which can be fitted to the top of the mast 2. The lower projecting arm 7 supports, on its end, a sleeve 10 which can be opened and closed and through which the mast 2 can be guided.

Alternatively, the upper projecting arm 8 could also be equipped with a sleeve 10 of this kind.

Returning to FIGS. 1 and 2, the solar module 3 has a cover 11, 12 on both its lower end 4 and its upper end 5, with an annular gap 13, 14 remaining between each cover 11, 12 and the solar module 3. Ambient air can be drawn in by convection (see flow arrows $P_1$) via the lower annular gap 13, can rise in the interior 15 of the tubular solar module 3 (flow arrows $P_2$, $P_3$) and can exit via the upper annular gap 14 (flow arrow $P_4$).

Instead of the annular gaps 13, 14, other types of ventilation openings may also be provided at the lower and the upper end 4, 5 of the solar module, for example a ring of circumferential openings at each end. The annular gap or ring of openings may be provided at any point in the interface region between the respective cover 11, 12 and the solar module 3, e.g. at the ends 3, 4 of the solar module 3, in the covers 11, 12 themselves or, as shown in FIGS. 1 and 2, between the respective cover 11, 12 and the solar module 3.

The interior 15 of the solar module 3 receives all the components required for operating the lighting device 1, and specifically one or more rechargeable batteries 16, 17 and (at least) one electronics module 18.

The solar module 3 powers (at least) one light 19 via the rechargeable batteries 16, 17 and the electronics module 18, which light, in the embodiment in FIGS. 1 and 2, simultaneously forms the lower cover 11 of the solar module 3 and in particular (if not necessarily) radiates downwards. In other words, the lower annular gap 13 is formed between the outer circumference of the light 19 and the lower end 4 of the solar module 3, and the cooling air flowing in at that point (flow arrows $P_1$) simultaneously cools the light 19. For this purpose, the light 19 is optionally provided with a cooling body 20 on its side facing the interior 15 of the solar module 3.

In detail, the solar module 3 has a tubular body 21 made of transparent material, e.g. glass or plastics material, which is equipped with photovoltaic elements 22 on its inner face and protects them against environmental influences. The photovoltaic elements 22 may for example be in the form of a plurality of small plates (only some of which are shown by dashed lines as a representation), which are wired to one another and line the inner face of the body 21 in the manner of a matrix. Alternatively, the photovoltaic elements 22 may be curved in a manner adapted to the inner circumference of the body 21, for example in the form of a tubular, multi-layered composite element, as described in the above-mentioned patent EP 2 071 635 B1 by the same applicant.

It is also possible for the solar module 3 to be made of one or more flexible photovoltaic element(s) that are rolled up or folded together to form a tube, for example made of flexible thin-film photovoltaic modules. In other variants, the solar module 3 may e.g. be composed of individual photovoltaic strips extending in the axial direction of the solar module. For example, rigid, planar, elongate photovoltaic elements 22 may directly form the sides of a tubular solar module 3 having a polygonal cross section, e.g. having a triangular, square, hexagonal or octagonal cross section, specifically optionally also without a protective transparent body 21.

In the present example, the transparent body 21 together with the photovoltaic elements 22 attached to its inner face is retained between two end rings 23, 24, which in turn are interconnected by rods 25 extending in the interior of the solar module 3. For example, two or more, optionally three, rods 25 distributed over the circumference of the solar module 3 are provided. Together with the support rings 23, 24, the rods 25 form the mechanical supporting structure of the solar module 3, such that no tensile forces, compressive forces or shear forces are exerted on the body 21 comprising the delicate photovoltaic elements 22, either by the support of the solar module 3 or by winds during operation. A resilient seal 23', 24' may be provided between each support ring 23, 24 and the transparent body 21 retained thereby, in order to accommodate different thermal expansion coefficients of the rods 25 on one hand and of the body 21 or photovoltaic elements 22 on the other hand.

As shown in FIG. 2, the rods 25 are connected to one another by a (here, three-armed) supporting platform 26. The lowermost rechargeable battery 16 is supported on the supporting platform 26. The additional rechargeable batteries may be stacked thereabove, i.e. an upper rechargeable battery 17 is supported directly on a lower rechargeable battery 16, or each of the rechargeable batteries 16, 17 could rest on its own supporting platform 26.

In addition, the rods 25 are connected to one another via one or more rings 27, 28, which each surround a rechargeable battery 16, 17, e.g. on the upper edge thereof. By means of the rings 27, 28, the rechargeable batteries 16, 17 are centered within the rods 25 and thus have radial spacing $r_1$ (FIG. 1) from the inner face of the solar module 3. Owing to the radial spacing $r_1$, there is an annular space between the outer face of the rechargeable batteries 16, 17 and the inner face of the solar module 3, in which the cooling air entering via the lower annular gap 13 rises upwards (flow arrows $P_2$) past the rechargeable batteries 16, 17 due to the chimney effect, in order to then exit via the upper annular gap 14.

The electronics module 18 also has radial spacing $r_2$ from the inner face of the solar module 3, such that, here too, cooling air can pass by without obstruction (flow arrows $P_3$). For the purpose of thermal decoupling, the electronics module is arranged with axial spacing $a_1$ from the rechargeable batteries 16, 17 stacked on top of one another, either thereabove, as shown, or alternatively therebelow. The rechargeable batteries 16, 17 are arranged with axial spacing $a_2$ from the light 19 for the purpose of thermal decoupling.

The components, i.e. the solar module 3 (more precisely, the photovoltaic elements 22 thereof), the rechargeable battery/batteries 16, 17, the electronics module 18 and the light 19, are connected to one another via electrical cables (not shown), which run in the interior 15 of the solar module 3. The lighting device 1 can therefore be operated completely autonomously. During the day, the photovoltaic elements 22 of the solar module 3 charge the rechargeable batteries 16, 17 via the electronics module 18, and at night (or as required), the charged rechargeable batteries (16, 17) power the light 19 via the electronics module 18. The photovoltaic elements 22 may of course also directly (jointly) power the light 19.

Figure 3:
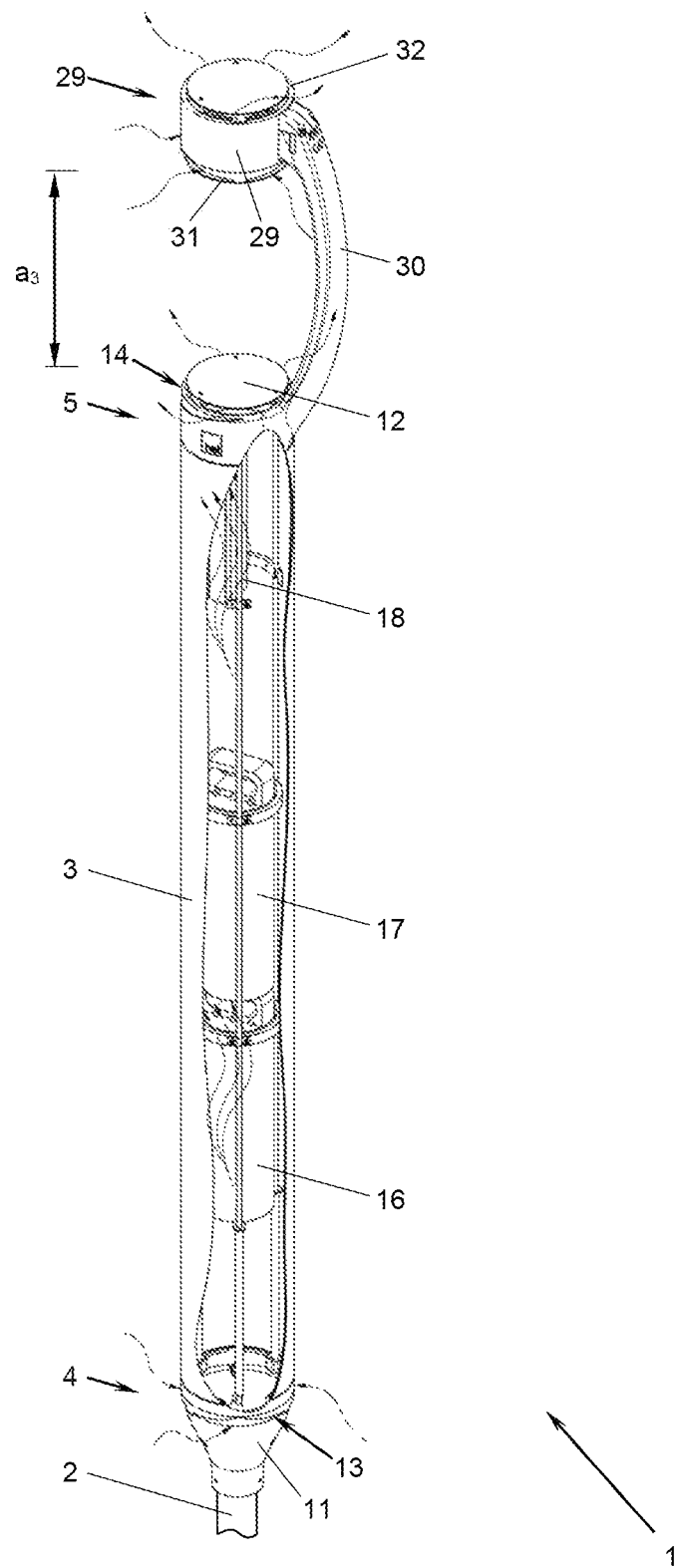
FIG. 3 shows a second embodiment of the lighting device in a partially cut-away perspective view.

FIG. 3 shows an alternative embodiment of the lighting device 1, which only differs from that in FIGS. 1, 2 and 4 in that the light 19 has a separate housing 29 here, is supported by an arm 30 fixed to the upper end 5 of the solar module 3, and is positioned above the solar module 3. The light 19 radiates downwards, for example. The housing 29 has separate annular gaps 31, 32 on its lower and its upper end, in order to cool the electrical components of the light 19 in the housing 29 by convection.

The housing 29 is approximately tubular and is arranged coaxially above the solar module 3 with axial spacing $a_3$. The cooling air exiting from the upper annular gap 14 in the solar module 3 sweeps upwards and thus cools the light 19 arranged thereabove.

In the embodiment in FIG. 3, the lower end 4 of the solar module 3, in particular the lower cover 11, may be designed as a retainer for mounting on the top of the mast 2.

The disclosed subject matter is not limited to the embodiments set out, but instead covers all the variants, modifications and the combinations thereof that fall within the scope of the accompanying claims.

What is claimed is:

1. A solar-operated lighting device comprising
a substantially tubular solar module, which is positioned vertically in a mounted position, the solar module having an upper end being located above a lower end of the solar module in the mounted position, wherein the solar module electrically powers a light via at least one rechargeable battery and an electronics module,
the at least one rechargeable battery and the electronics module each being arranged in an interior of the solar module with radial spacing therefrom,
wherein the solar module has an upper cover at its upper end and a lower cover at its lower end, and
wherein the solar module has an upper annular gap or ring of openings, which forms an upper ventilation opening in an upper interface region between the upper cover and the solar module, and a lower annular gap or ring of openings, which forms a lower ventilation opening in an interface region between the lower cover and the solar module, such that the solar module, in the mounted position, is traversed by a flow of cooling air flowing by convection from the lower ventilation opening to the upper ventilation opening resulting in a convection cooling of components contained in the interior of the solar module, and wherein the lower cover includes the light.

2. The lighting device according to claim 1, wherein the light is provided with a cooling body on its side facing the interior of the solar module.

3. A solar-operated lighting device comprising a substantially tubular solar module, which is positioned vertically in a mounted position and electrically powers a light via at least one rechargeable battery and an electronics module, the at least one rechargeable battery and the electronics module each being arranged in an interior of the solar module with radial spacing therefrom, wherein the solar module has an upper cover at its upper end and a lower cover at its lower end, and wherein the solar module has an upper annular gap or ring of openings, which forms an upper ventilation opening in an upper interface region between the upper cover and the solar module, and a lower annular gap or ring of openings, which forms a lower ventilation opening in an interface region between the lower cover and the solar module, wherein the lower cover is formed by the light, and wherein the solar module is equipped on one end with a projecting arm for mounting on a mast or a building.

4. The lighting device according to claim 1, wherein a plurality of rechargeable batteries are stacked on top of one another in the interior of the solar module.

5. The lighting device according to claim 1, wherein the electronics module is positioned above the one or more rechargeable batteries with spacing.

6. The lighting device according to claim 1, wherein the solar module comprises a tubular transparent body having photovoltaic elements on its inner face, the tubular transparent body being retained between two end rings, which are interconnected by rods extending in the interior of the solar module.

7. The lighting device according to claim 6, wherein at least three rods of the rods are distributed over an inner circumference of the solar module.

8. The lighting device according to claim 6, wherein the rods are connected to one another via at least one supporting platform, on which a lowermost of the one or more rechargeable batteries is supported.

9. The lighting device according to claim 6, wherein the rods are connected to one another via at least one additional ring.

10. The lighting device according to claim 9, wherein each ring surrounds one of the one or more rechargeable batteries.

11. The lighting device according to claim 9, wherein at least two rings are distributed over a height of the solar module.

12. The lighting device according to claim 1, wherein the solar module is equipped on both ends each with a projecting arm for mounting on a mast or a building.

13. The lighting device according to claim 10, wherein at least three rings are distributed over a height of the solar module.

14. A solar-operated lighting device comprising a substantially tubular solar module, which is positioned vertically in a mounted position, the solar module having an upper end being located above a lower end of the solar module in the mounted position, wherein the solar module electrically powers a light via at least one rechargeable battery and an electronics module, the at least one rechargeable battery and the electronics module each being arranged in an interior of the solar module with radial spacing therefrom, the solar module having a ventilation opening at both its upper end and its lower end, such that the solar module, in the mounted position, is traversed by a flow of cooling air flowing by convection from the ventilation opening at the lower end to the ventilation opening at the upper end resulting in a convection cooling of components contained in the interior of the solar module, and the solar module comprising an upper cover at the upper end and a lower cover at the lower end, and an annular gap or a ring of openings, which forms the respective ventilation opening, being provided in a respective interface region between each cover and the solar module, and wherein the lower cover includes the light.

15. The lighting device according to claim 14, wherein the light is provided with a cooling body on its side facing the interior of the solar module.

16. The lighting device according to claim 14, wherein a plurality of rechargeable batteries are stacked on top of one another in the interior of the solar module.

17. The lighting device according to claim 14, wherein the electronics module is positioned above the one or more rechargeable batteries with spacing.

* * * * *